United States Patent [19]

Fodale

[11] Patent Number: 4,756,020
[45] Date of Patent: Jul. 5, 1988

[54] METHOD AND APPARATUS FOR DISALLOWING THE EXTENSION OF A CALL THROUGH A NETWORK

[75] Inventor: Joseph V. Fodale, Lincroft, N.J.

[73] Assignee: American Telephone and Telegraph Company, AT&T Bell Laboratories, Murray Hill, N.J.

[21] Appl. No.: 117,392

[22] Filed: Nov. 2, 1987

Related U.S. Application Data

[63] Continuation of Ser. No. 771,557, Aug. 30, 1985, abandoned.

[51] Int. Cl.$^4$ .................. H04M 1/66; H04M 3/38
[52] U.S. Cl. ...................... 379/112; 379/91; 379/127; 379/197
[58] Field of Search ............ 379/112, 96, 15, 188, 379/230, 115, 116, 120, 127, 196, 197, 222; 340/825.33

[56] References Cited

U.S. PATENT DOCUMENTS

| | | | |
|---|---|---|---|
| 4,162,377 | 7/1979 | Mearns | 379/127 |
| 4,166,929 | 9/1979 | Sheinbein | 379/207 |
| 4,191,860 | 3/1980 | Weber | 379/115 |
| 4,277,649 | 7/1981 | Sheinbein | 379/201 |
| 4,439,636 | 3/1984 | Newkirk et al. | 379/123 |

OTHER PUBLICATIONS

W. Ulrich et al. "Translations in the No. 1 Electronic Switching System", The Bell System Technical Journal, vol. 43, No. 5. Pt. 2, Sep. 1964, pp. 2542–2545.
"Operator Services System Generic Requirements, Section 22.3, Line Information Database", Bell Communications Research Technical Advisory, TA TSY-0900190, Issue 1, Jul. 1985, pp. 15–19.

*Primary Examiner*—Stafford D. Schreyer
*Attorney, Agent, or Firm*—Richard J. Godlewski

[57] ABSTRACT

Method and apparatus is disclosed for selectively disallowing and allowing the extension of a call originated by a calling customer through a toll telecommunications network when the billing number involved with the call has a predetermined billing status such as delinquent payment. The toll network includes a toll office for switching calls between local telephone networks. The toll network also includes a data base having a list of delinquent payment billing numbers. In response to a call originated by a calling customer, the toll office sends the billing number involved with the call received from the local network to the data base. When the billing number involved with the call is in a list of billing numbers having a delinquent payment status, a "deny call" reply message is returned to the toll office to disallow the extension of the call through the toll network. The toll office also announces to the calling customer the disallowance of the call to discourage further attempts through the network. The toll office may include or utilize a remotely located operator system to process calls by offering calling customers alternate billing arrangements when the call is disallowed. A "call allow" reply message from the data base is returned to the operator system to process an operator assisted call.

44 Claims, 6 Drawing Sheets

FIG. 5
QUERY MESSAGE FORMAT
(NPA-NXX)

| | 1 | | | | | | | | | | | | | | | | | | 20 |
|---|---|---|---|---|---|---|---|---|---|---|---|---|---|---|---|---|---|---|---|
| ISU | MUM HEADING | | | | LENGTH | | | DOMAIN | | | ADDRESS A | | | | | | | | |
| | 1 | 0 | 1 | 1 | 1 | 0 | 1 | 1 | 0 | 0 | | | | | | | | | |
| SSU 1 | SSU HEADING | | | MMUM CATEGORY | | | | PR | ** | | ADDRESS B | | | | | | | | |
| | 1 | 1 | 0 | 0 | 1 | 1 | 0 | 0 | 1 | 0 | | | | | | | | | |
| SSU 2 | SSU HEADING | | | RT | **** | | | APPLICATION TYPE | | | NCD MSG TYPE | | | DR | * | * | * | * | |
| | 1 | 1 | 0 | 1 | 0 | 0 | 0 | 1 | 0 | 1 | 1 | 0 | 0 | 0 | 1 | | | | |
| SSU 3 | SSU HEADING | | | RTN CODE | | | RETURN ADDRESS | | | | | | | | | | | | |
| | 1 | 1 | 0 | | | | | | | | | | | | | | | | |
| SSU 4 | SSU HEADING | | | CALL ID PART 1 | | | | | | | | | | | | | | | |
| | 1 | 1 | 0 | | | | | | | | | | | | | | | | |
| SSU 5 | SSU HEADING | | | CALL ID PART 2 | | | | | | | | | | | | | | | |
| | 1 | 1 | 0 | | | | | | | | | | | | | | | | |
| SSU 6 | SSU HEADING | | | * | * | * | | XXXX | | | | | | | | | | | |
| | 1 | 1 | 0 | | | | | | | | | | | | | | | | |

** – SPARE BIT POSITION RESERVED FOR DIRECT SIGNALING USE
* – SPARE BIT POSITION RESERVED FOR APPLICATION USE

FIG. 6
REPLY MESSAGE FORMAT

| | 1 | | | | | | | | | | | | | | | | | | | 20 |
|---|---|---|---|---|---|---|---|---|---|---|---|---|---|---|---|---|---|---|---|---|
| ISU | \multicolumn{4}{c}{MUM HEADING} | | | | | | | | | | | | | | | | | |

| | \multicolumn{4}{l}{} | | | | | | | | | | | | | | | | | |
|---|---|---|---|---|---|---|---|---|---|---|---|---|---|---|---|---|---|---|---|---|

Table (reconstructed):

| Row | Col 1-4 | Col 5-8 | Col 9-11 | Col 12-13 | Col 14-20 |
|---|---|---|---|---|---|
| ISU | MUM HEADING: 1 0 1 1 | LENGTH: 1 0 1 | DOMAIN: 0 0 0 | DB OVLD | ADDRESS A (+ +) |
| SSU 1 | SSU HEADING: 1 1 0 | MMUM CATEGORY: 0 1 1 0 | PR ** : 0 1 0 | | ADDRESS B |
| SSU 2 | SSU HEADING: 1 1 0 | RT ****: 0 0 0 0 | APPLICATION TYPE: 1 0 1 | NCD MSG TYPE: 1 0 0 1 1 | REPLY CODE |
| SSU 3 | SSU HEADING: 1 1 0 | \multicolumn{4}{l}{CALL ID PART 1} |
| SSU 4 | SSU HEADING: 1 1 0 | \multicolumn{4}{l}{CALL ID PART 2} |
| SSU 5 | SSU HEADING: 1 1 0 | MEAS TYPE | CONTROL LEVEL | \multicolumn{2}{l}{QUERIED ADDRESS A} |
| SSU 6 | SSU HEADING: 1 1 0 | TRTMT | DURATION | \multicolumn{2}{l}{QUERIED ADDRESS B} |

\*\* — SPARE BIT POSITION RESERVED FOR DIRECT SIGNALING USE
\+ — SPARE BIT POSITION WHEN ROUTING BY FUNCTION NUMBER

METHOD AND APPARATUS FOR DISALLOWING THE EXTENSION OF A CALL THROUGH A NETWORK

This application is a continuation of application, Ser. No. 771,557, filed Aug. 30, 1985, abandoned.

TECHNICAL FIELD

This invention relates generally to telecommunications networks and more particularly to method and apparatus for disallowing the extension of a call through a network when the billing number involved with the call has a predetermined status.

BACKGROUND OF THE INVENTION

In the past, when a customer was delinquent in the payment of telephone call charges, the local telephone company would commonly disconnect the customer's line or not provide the customer with dial tone until the delinquent charges were paid.

With only one long distance interconnect carrier serving the customers of a local telephone company, the local company would record and bill their customers for long distance as well as local telephone call charges.

With more than one long distance interconnect carrier serving local company customers, the new interconnect carriers recorded and billed long distance calls by requiring their customers to dial at least two telephone numbers, one to reach their long distance network, and the other to reach the called customer. In addition, the calling customer was also required to dial a personal identification number when connected to the interconnect carrier network. This number is used to verify that the caller was authorized to use the interconnect carrier's services and to charge for the call.

Calling customer identification and billing is typically performed by the new interconnect carriers only in a limited geographic area incorporating specific routes. Customers may also subscribe to make calls when they are outside the local geographic area of the interconnect carrier. However, a customer must first make an AT&T "800" service call to reach the new interconnect carrier, and then dial the telephone number of the called line followed by their own telephone number and personal identification number. This involves two interconnect carrier calls plus dialing the calling customer's telephone and personal identification numbers.

Recently, the Bell System local telephone operating companies were separated from AT&T which provides long distance interconnect carrier service. In addition, all local telephone companies were required to give their customers equal access to all interconnect carriers. That is, each interconnect carrier can be accessed by dialing the same number of digits. The local telephone company can still disconnect a customer's line for the delinquent payment of local telephone call charges. However, not all government regulators allow the local telephone companies nor do the local telephone companies desire to disconnect a customer's line for the delinquent payment of long distance interconnect carrier charges, particularly when the payment of local telephone call charges is not delinquent.

As a result, the interconnect carriers face the problem of how to deny long distance service or disallow the extension of a long distance call through their network when the calling customer is delinquent in the payment of long distance telephone call charges.

SUMMARY OF THE INVENTION

The foregoing problems are solved and a technical advance is achieved by an illustrative embodiment of the invention in a method of and apparatus for disallowing the extension of a call originated by a calling customer through an interconnect network when the billing number involved with the call has a delinquent payment status. The interconnect network serves a plurality of local offices and customers and has a toll office for processing calls through the network toward a destination and also advantageously has a data base for the customers that stores the delinquent payment status of the customer's billing numbers. In response to a call from a calling customer, either a switching or operator system included in the toll office sends the billing number involved with the call to the data base to determine the payment status of the billing number involved with the call. The data base returns a reply message to the switching or operator system advantageously to disallow the extension of the call through the network when the payment status of the billing number involved with the call is delinquent.

The data base is capable of sending another reply message to the switching or operator system included in the network to allow the extension of the call through the network when the billing number has a payment status indicating, for example, that network charges have been paid in a timely manner.

A broad feature of this invention is the switching system sending to the data base the billing number involved with a call to determine the payment status of the billing number and receiving a reply message when the payment status of the billing number is delinquent.

A second broad feature of this invention is the data base obtaining the status of the billing number involved with a call originated by a customer and controlling the disallowance of the call through the network when the billing number involved with the call is in a list of billing numbers having a delinquent payment status.

A third broad feature of this invention is the provision of an operator system for sending the billing number involved with a call originated by a customer to the data base and providing call handling services based on the reply message received from the data base and information received from the customer.

The method includes determining the status of the billing number involved with the call from the data base in response to a call and disallowing the extension of the call through the network when the billing number has a predetermined status such as delinquent payment.

The method further includes allowing the extension of the call through the network when the billing number involved with the call has another predetermined status such as other than delinquent payment.

An adjunct feature is announcing to the calling customer the disallowance of the call through the network when the billing number has the delinquent payment status.

In accordance with another feature of this invention when the call is disallowed, a second billing number may be received from the calling customer to allow the extension of the call through the network when the second billing number has a status indicating, for example, that network charges have been paid in a timely manner. For example, this allows the calling customer to provide alternate billing arrangements such as charging the call to a calling or credit card to allow the extension of the call through the network when the call is initially disallowed.

Determining the status of the billing number involved with a call includes sending the billing number to the data base in response to the call, interrogating the data base for the status of the billing number; and sending a reply message from the data base to disallow the extension of the call through the network when the billing number has, for example, a delinquent payment status.

Another feature of this invention is the ability to store and change the status of the billing numbers in the data base from, for example, a remotely located accounting office.

A specific embodiment of this invention is used with a toll telecommunications network having a switching system for switching calls between local or other nonaffiliated networks that serve a plurality of customers. A list of billing numbers having a delinquent payment status is stored in a data base included in the toll network. The method of disallowing the extension of a call originated by a calling customer through the toll network includes sending a query message with the billing number involved with the call from the switching system to the data base in response to the call. In response to the query message, the data base list is searched for the billing number involved with the call, and a "deny call" reply message is sent to the switching system to disallow the extension of the call through the toll network when the billing number involved with the call is in the data base list. Upon receipt of the "deny call" reply message, the switching system disallows the extension of the call through the network.

The extension of a call through the network from a calling customer will be allowed when the call is received on the termination of a predetermined trunk included in the network. In addition, the call will also be allowed through the network when the call is to or from a customer line having a predetermined identification number.

An operator system may also be included in the network for processing calls through the network. As such, the method also includes searching the list of delinquent payment status billing numbers in the data base and selectively allowing and disallowing the extension of a call through the network from the operator system depending on whether or not the billing number involved with the call is in the list of billing numbers having the delinquent payment status.

After the call has been initially disallowed, the method further includes searching the data base list for a second billing number received from the calling customer. When the second billing number is not in the delinquent payment status billing number list, the data base sends an "allow call" reply message to the operator system which allows the extension of the cell through the network.

The data base of the invention serves a plurality of switching offices that process calls for a plurality of customers. The data base comprises means responsive to the billing number involved with a call from a calling customer for obtaining the status of the billing number and means responsive to the obtained status for effecting the disallowance of a call originated by the calling customer through the network.

Another broad feature of this invention involves determining whether a number identifying a calling customer line is one of a plurality of numbers in a data base shared by a plurality of telecommunications systems in response to a call originated from the calling customer line. The plurality of systems serve a telecommunications network and a plurality of customer lines. Each number in the plurality of numbers in the data base is for identifying an individual one of the lines. An extension of the call through the network is disallowed when the number identifying the calling customer line is one of the numbers in the data base or, alternatively, when the number has a predetermined status. This method is also utilized by any one of a plurality of local exchange carrier telecommunications systems serving one or more toll interconnect carrier telecommunications networks. The method is advantageously used to screen a call from a calling customer which may be served by any one of the interconnect carrier networks. This permits the local exchange carrier to provide screening services such as for delinquent payment for any number of different interconnect carrier networks without having each interconnect carrier network administer and maintain separate hardware and software for the data base of each interconnect carrier. Although a separate data base is maintained by the local exchange carrier for each interconnect carrier network, overhead costs associated with this service are significantly reduced.

Another broad feature associated with this invention is that each local exchange carrier telecommunications system utilizing this call extension disallowance feature includes means responsive to a call from a calling customer line for sending a query message including a number identifying the calling customer line to a data base shared by the systems. The data base again has a plurality of numbers each for identifying an individual one of the lines or, alternatively, having a status for each one of the numbers identifying a line. Also included in the local exchange carrier system is means for disallowing the extension of the call through the interconnect carrier network when a response to the query message indicates that the number identifying the calling customer line is one of the numbers in the data base or, alternatively, when the number identifying the calling customer line has a predetermined status such as a delinquent payment status.

Another feature of this invention is the data base that serves the telecommunications systems which implements the method for controlling the disallowance of the extension through the network of a call originated by a calling customer line. This method of the data base includes interrogating a memory having a plurality of numbers for a number identifying the calling customer line in response to the call and controlling the disallowance of the extension of the call through the network when the number identifying the calling customer line is one of the plurality included in the memory. The data base includes means for storing the numbers, means for searching the numbers for a number identifying the calling customer line which originated a call, and means for effecting a disallowance when the number is one of the plurality of numbers.

Each telecommunications system of this invention that serves a telecommunications network serving a plurality of customer lines includes means for determining whether or not a number identifying the calling customer line is one of a plurality of numbers in the data base shared by the systems in response to a call. The system further includes means for advantageously disallowing the extension of the call through the network when the number identifying the call is one of the numbers in the data base.

BRIEF DESCRIPTION OF THE DRAWING

The invention may be better understood from the following detailed description when read with reference to the drawing in which.

DETAILED DESCRIPTION

Figure 1:
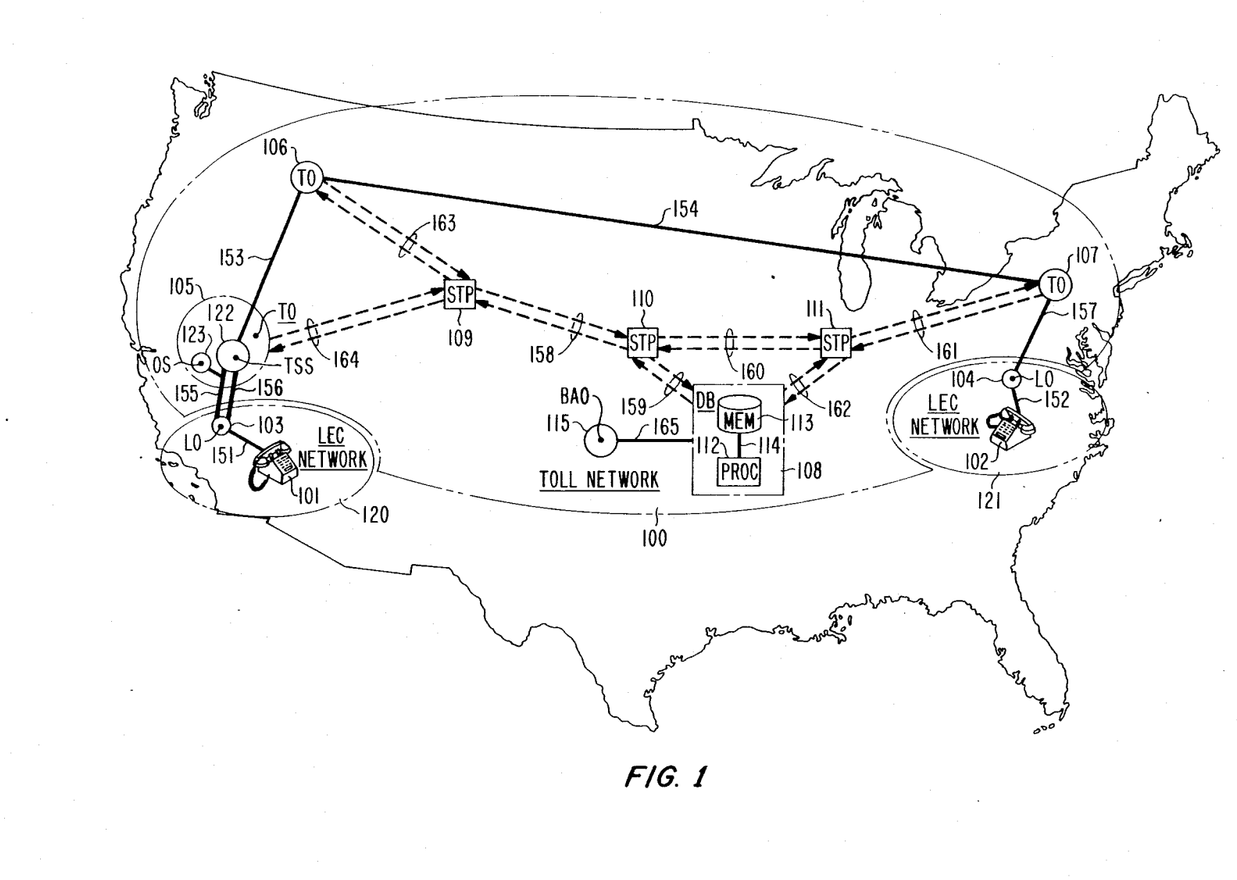
FIG. 1 depicts an illustrative telecommunications interconnect carrier network.

Depicted in FIG. 1 is an illustrative toll telecommunications network 100. This toll network includes illustrative apparatus for and utilizes an illustrative method of disallowing the extension of a call originated by a calling customer through the toll network when the billing number involved with the call has a predetermined status such as delinquent payment. The toll network, also commonly known as a toll interconnect carrier network, serves a plurality of local exchange carrier networks, such as 120 and 121, and a plurality of customers, such as those at telephone station sets 101 and 102. Each of the local networks includes one or more local telephone offices, such as 103 and 104. The toll network includes a plurality of communication lines, such as trunks 153–157, for carrying calls between the local exchange carrier networks. The toll network also includes toll offices, such as 105–107, for selectively interconnecting the trunks in response to routing information, such as the telephone number of the called customer line provided by the calling customer. Toll offices 105 and 107 serve local offices 103 and 104 via trunks 155 through 157, as shown. Each of local offices 103 and 104 serves a plurality of customers via station sets, such as 101 and 102, connected to customer communication lines, such as 151 and 152. All of the customers served by a local office may not be served by the same interconnect carrier network. In fact, many local networks and the offices contained therein are served by several different interconnect carrier networks each of which serves a different group of subscribing customers.

The toll network further includes data base 108 that stores billing information and processes billing information requests for the customers served by the toll network. In response to a call originated by a calling customer for extension through the toll network, the toll office receiving the call sends to the data base a query message to determine the status of the billing number involved with the call. In response to the query message, the data base obtains the status of the billing number involved with the call to selectively allow and disallow the extension of the call through the toll network. Data base 108 comprises processor 112 such as the AT&T 3B20D computer and disk storage memory 113 interconnected by common network interface communication ring 114 that are commercially available along with a system of programs to store, update, and process billing information in the memory. The common network interface communication ring is also equipped with CCIS facilities for communication with signal transfer points and the toll offices. The billing information stored in data base 108 may also be entered and updated from a well-known remotely located accounting and billing administrative office 115 via data link 165. The memory stores the billing information for obtaining the status of a billing number involved with a call originated by a calling customer. Depending on the obtained status of the billing number involved with a call, the processor sends one of several reply messages to effect the disallowance or allowance of the call. For example, when the billing information includes a list of billing numbers having a delinquent payment status, the processor sends a "deny call" reply message to the toll office to disallow the extension of the call through the toll network when the billing number involved with the call is in the list. Alternatively, the billing information could include the billing number and status of every customer served by the toll network. As a result, the processor sends either an "allow call" or "deny call" reply message to the toll office to allow or disallow the extension of the call through the toll network depending on the obtained status of the billing number involved with the call.

The toll network also includes a well-known common channel signaling (CCS) system, also known as a common channel interoffice signaling (CCIS) system, for transferring messages indicative of selected billing information between data base 108 and the toll offices. The CCIS system includes signal transfer points (STP) 109–111 and CCIS data links 158–164 interconnected as shown. The CCIS system is also used to transfer messages indicative of other information between toll offices, such as well-known control, routing, and supervisory information. The CCIS system transfers billing, control, routing, and supervisory information messages separate from the voice and data messages that are transferred on trunks 153 and 154. A typical CCIS system is described in *The Bell System Technical Journal*, Volume 57, No. 2, February, 1978, and in U.S. Pat. No. 3,624,613 of W. B. Smith et al., issued Nov. 30, 1971. Substitution of the 2STP system commercially available from AT&T for the 1STP system described in the cited CCIS system reference is recommended for high volume message applications.

By way of example, each of local telephone offices 103 and 104 is suitably an electronic program-controlled switching system of the type disclosed in U.S. Pat. No. 3,570,008, issued to R. W. Downing et al., on Mar. 9, 1971, and similarly disclosed in *The Bell System Technical Journal*. Vol. 43, No. 5, Parts I and II, September, 1964. An updated central processor suitable for use in these switching systems is described in *The Bell System Technical Journal*, Volume 56, No. 2, February, 1977. The cited references may be consulted for a more comprehensive understanding of the construction and operation of an electronic program-controlled local switching system. These switching systems process calls for customers switched or directly connected thereto.

In response to a call originated by a calling customer at station set 101 to a called customer at station set 102, local telephone office 103 forwards to toll office 105 routing information provided by the calling customer, such as the telephone number of called customer line 152. Local office 103 also sends billing information for the calling customer, such as the billing number involved with the call. The billing number involved with the call typically comprises the line identification number of the calling line, commonly known as the telephone number of the line. Alternatively, the customer may enter a billing number such as a credit or calling card number or other personal identification that is sent to the toll office instead of the calling line telephone number. In addition, the entered billing number may be the billing number of a third party or that of the called customer, such as in a collect telephone call.

Each of toll offices 105–107 includes a stored program-controlled switching system 122, such as the 4ESS ™ digital switch with common channel interoffice signaling (CCIS) facilities, which is manufactured by AT&T Technologies, Inc. This digital switch is described in detail in *The Bell System Technical Journal,* Volume 56, No. 7, September, 1977, and Volume 60, No. 6, Part II, July-August, 1981. These references may be consulted for a more comprehensive understanding of the construction and operations of a toll switching system.

Each of toll offices 105–107 may also include an operator system such as 123 or have access to a remotely located operator system for processing operator-assisted calls. A typical operator system, such as the traffic service position system for use with local and toll offices, is described in the *The Bell System Technical Journal,* Volume 49, No. 10, December, 1970, and Volume 58, No. 6, Part 1 of 2, July-August, 1979, and in U.S. Pat. No. 3,484,560 of R. J. Jaeger, issued Dec. 16, 1969.

In response to a call originated by a calling customer and received from a local office, the switching or operator system of a toll office sends a CCIS query message to the data base and receives from the data base a CCIS reply message indicative of the status of the billing number involved with the call. The query message includes the billing number involved with the call that is received from the local office and a call identifier that is provided by the switching or operator system to identify the call.

In response to the query message from the toll office, the data base interrogates its memory to obtain the status of the billing number involved with the call. By way of example, when the billing number involved with the call has a delinquent payment status, such as when the customer is delinquent in paying toll network charges, the data base sends a CCIS "deny call" reply message to the toll office to disallow the extension of the call through the toll network. In addition, when the toll office also includes an operator system, a CCIS "allow call" reply message is sent to the operator system when the billing number involved with the call has a status, for example, other than delinquent payment. Furthermore, the data base may also contain other information such as billing charges, credit limits, allowed customer services, etc. for each billing number associated with a customer or customer line served by the toll network. This information may be utilized by the switching or operator system of a toll office to provide other network services.

In response to receiving the "deny call" reply message from the data base, toll office 105 disallows the extension of the call through the toll network and announces to the calling customer the disallowance of the call through the toll network. This announcement is stored in well-known recorded announcement equipment of the switching system and is intended to discourage the calling customer from making further call attempts through the toll network that will likewise be disallowed and only serve to congest the toll network. In addition, the announcement may direct the customer to call an "800" service number to receive information concerning his billing number. Normally, a customer would be given ample notice concerning payment of delinquent charges before the extension of toll network calls would be disallowed or denied.

When the toll office also includes or utilizes an operator system, an operator associated therewith may offer the calling customer alternate billing arrangements to allow the extension of the call through the toll network when a "deny call" deny message is initially received from the data base. These alternate billing arrangements may include billing to a second, different, billing number; reversing the charges to the called customer telephone number; billing to a third party billing number; or billing to a personal identification number of the calling customer. By way of example, when the operator receives a second billing number from the customer, a second query message is sent to the data base to obtain the status thereof. When the status of the billing number is, for example, not delinquent, the data base sends an "allow call" reply message to the operator system which in turn forwards the call to the toll switching system to switch the call through the toll network.

Figure 2:
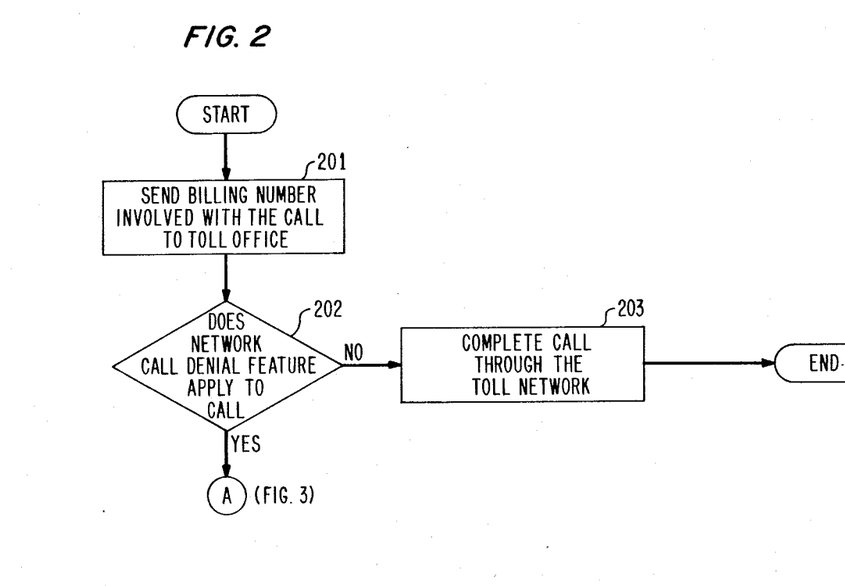
FIGS. 2 through 4 depict a flow diagram illustrating the principles of the method of the invention implemented in the toll interconnect carrier network illustrated in FIG. 1.
Figure 3:
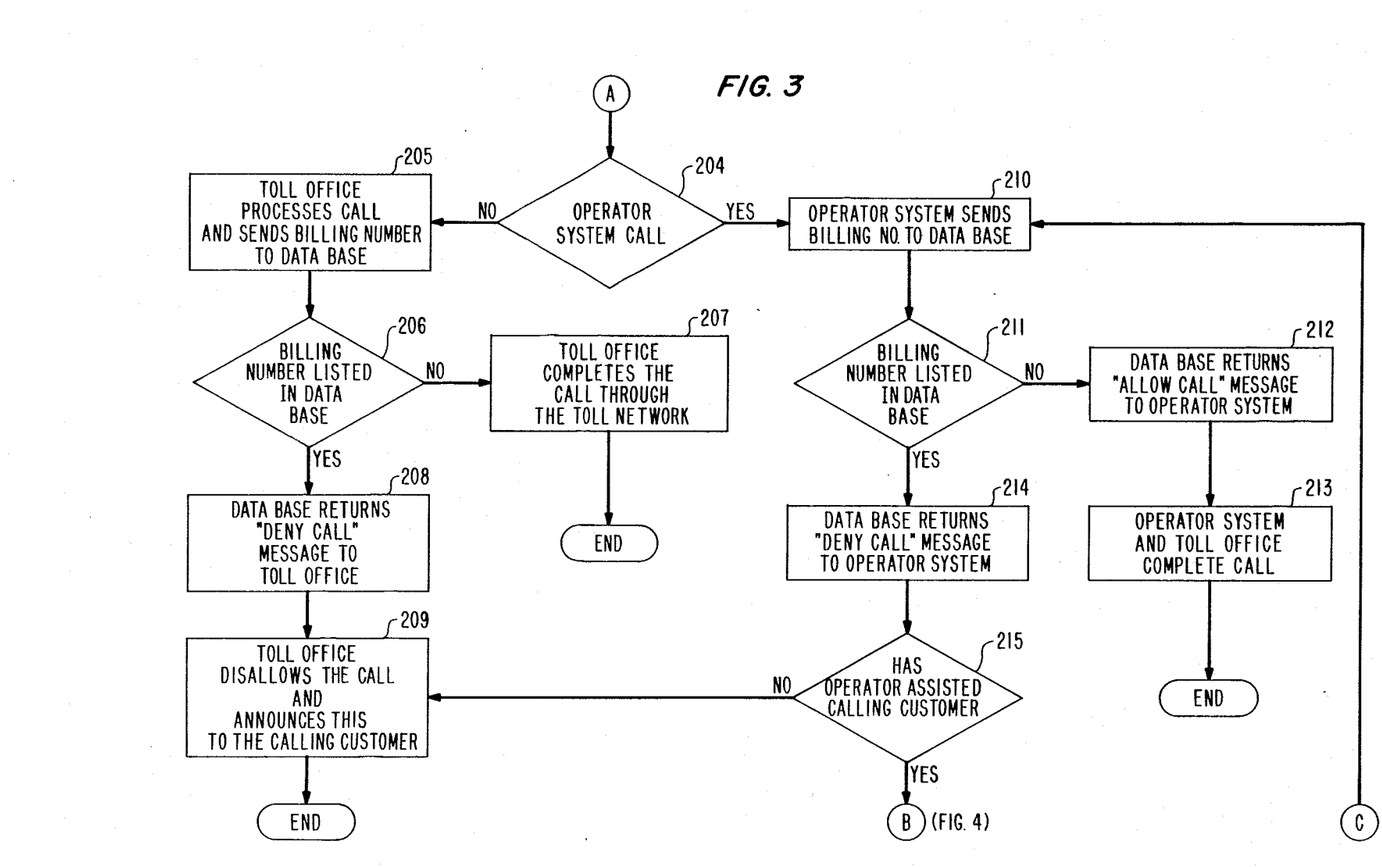
Figure 4:
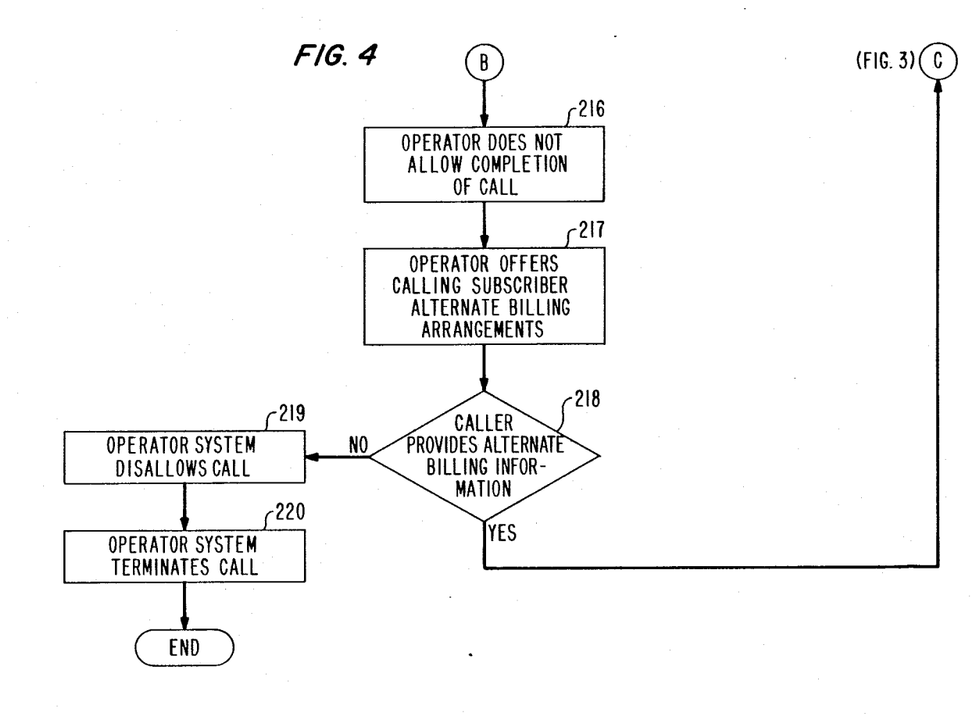

Depicted in FIGS. 2 through 4 is a flow diagram illustrating one implementation of the method of disallowing the extension of a call originated by a calling customer through the toll network illustrated in FIG. 1 when the billing number involved with the call has a predetermined status, such as delinquent payment. This method of disallowing the extension of a call through a network may also be referred to as a network call denial feature. For purposes of illustration, it is assumed that a calling customer at station set 101 wishes to place a call through the toll network to the called customer at station set 102. To originate the call, the calling customer lifts the handset of station set 101, which together with calling line 151 assumes a well-known "off-hook" supervisory state, and enters the telephone number of called customer line 152 in a well-known manner. Local office 103 detects the "off-hook" supervisory state of the calling station set and line and collects the entered digits of the telephone number of the called line. Local office 103 analyzes the telephone number of the called line and determines that the call must be forwarded to toll office 105 via direct trunk 156. After exchanging a series of well-known supervisory signals with toll office 105, local office 103 forwards the called line telephone number to the toll office to extend the call through the toll network to called customer line 152 and station set 102. In addition, local office 103 also sends the billing number involved with the call to toll office 105 (block 201). Unless the customer has entered an alternate billing number, the local office sends the telephone number of the calling line as the billing number involved with the call. This process is known as and commonly referred to as automatic number identification (ANI). Either one or both of local office 103 and toll office 105 may record and bill the billing number involved with the call. In response to receiving the billing number involved with the call, the toll office first determines whether the network call denial feature is applicable to the call (block 202).

By way of example, Table 1 lists those types of calls to which the network call denial feature does not apply. As shown, this determination is based on one or more criteria as indicated by an (x) adjacent to the type of call in the table: incoming trunk (ICT) identification, calling line identification, and called line identification. For instance, when the call is an inward wide area telephone or "800" service call, the called line is charged for the call. Thus, a billing number status check of the calling line is not necessary. In addition, when the call is placed from, for example, a direct interconnect private branch exchange (PBX) or a cellular radio, a billing number status check of the calling line is also not necessary. Thus, as shown in blocks 202 and 203 of FIG. 2, when the type of call is listed in Table 1, the network call denial feature does not apply, and the extension of the call through the toll network is allowed. As a result, the call is switched and completed through the toll network in a well-known manner.

TABLE 1

| TYPE OF CALL | A | B | C |
|---|---|---|---|
| 1. Direct Interconnect PBX | X | | |
| 2. Direct Interconnect Cellular Radio | X | | |
| 3. International Carrier (INC) Calls | | | X |
| 4. "800" Calls (INWATS) | | | X |
| 5. SDN Calls | X | | |
| 6. Coin-Paid Calls | X | | |
| 7. Telco Calls Handled By A Shared AT&T-C Switch | | X | X |
| 8. AT&T-C International Collect Call | | | X |
| 9. Operator Special Dial Codes | | | X |
| 10. Special Billing Numbers | | X | |
| 11. 900-200-XXXX Calls | | | X |
| 12. Direct Connect Outwats Calls | X | | |
| 13. Switched Access Outwats Calls | X | X | |

A = ICT
B = CALLING LINE ID
C = CALLED LINE ID

Local office 103 determines whether the call requires the assistance of an operator system by examining the first digit provided by the calling customer (block 204). A first digit "0" typically indicates an operator-assistance call with the use of an operator system. A first digit "1" typically indicates a direct-dial long distance telephone call.

Figure 5:
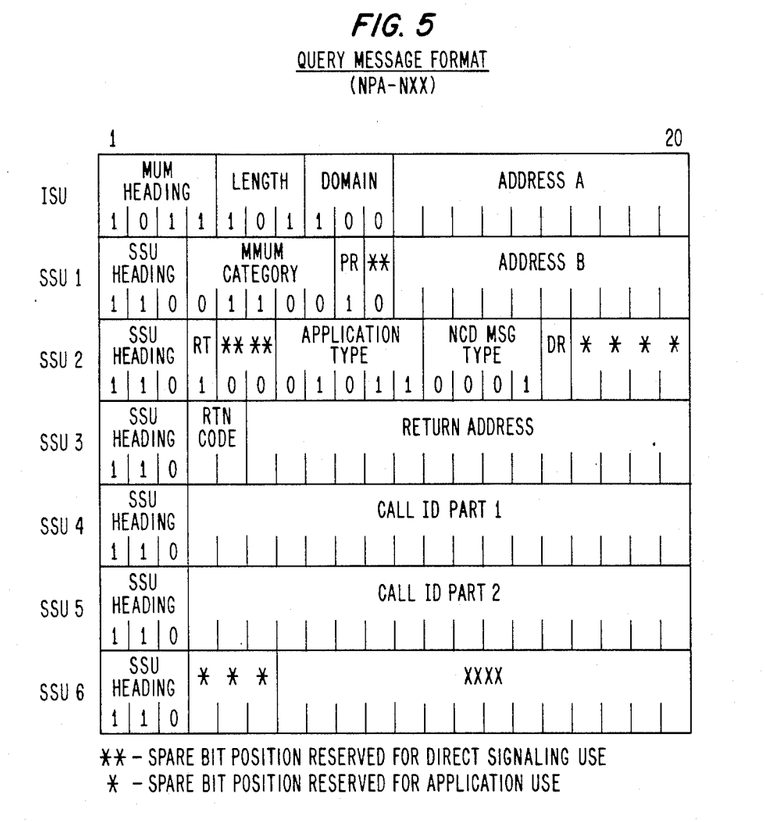
FIG. 5 depicts an illustrative query message format.

When the call is a direct-dial call, toll office 105 receives the call on the termination of a direct trunk such as trunk 156 from local office 103 and processes the call in a well-known manner. In addition, the toll office sends the billing number involved with the call in a CCIS query message to data base 108 via signal transfer point 109 and 110 (block 205). Depicted in FIG. 5 is the format of an illustrative CCIS query message. The CCIS query message is in the well-known CCIS6 message format and includes the billing number involved with the call in the ADDRESS A and B fields, a call identifier in the CALL ID PART 1 and 2 fields, and a demand response indicator in the DR field. The demand response indicator specifies whether only a "deny call" reply message need be returned when the extension of the call through the toll network is to be disallowed or whether a "deny call" or "allow call" reply message must be returned regardless of the call disposition. Table II lists the fields of the query message depicted in FIG. 5.

TABLE II

Query Message Field Content (NPA-NXX)

A. Domain - bits 8-10/ISU

The domain field specifies how the address A and address B fields should be interpreted to route the message through the network.
    100        Network Call Denial Application B. Address A - bits 11-20/ISU Address field A contains the NPA (in binary) of the billing number.

C. Address B - bits 11-20/1SSU

Address Field B contains the NXX (in binary) of the

TABLE II-continued

Query Message Field Content (NPA-NXX)

billing number.

D. Direct Signaling Application Type - bits 7-11/2SSU

The Direct Signaling Application Type identifies the application that uses a given message.
    01011      Network Call Denial E. NCD Message Type - bits 12-15/2SSU The NCD Message Type indicates that this message is a query.
    0001       NCD Query - Billing number of
               the NPA-NXX type F. Demand Response Indicator - bit 16/2SSU The Demand Response Indicator informs the NCP whether a reply message is required.
    0          Response only if call
               is to be denied
    1          Always respond, regardless
               of call disposition G. Call Identifier Part 1 - bits 4-20/4SSU This field holds the first part of the call identifier assigned by the originating switching office.

H. Call Identifier Part 2 - bits 4-20/5SSU

This field holds the second part of the call identifier assigned by the originating switching office.

I. XXXX - bits 7-20/6SSU

This field holds the last four digits (in binary) of the ten-digit billing number.

As previously described, the billing number commonly involved with a call is the telephone number of the calling line. The demand response indicator from a toll switching system specifies that a "deny call" reply message be returned only when the billing number involved with the identified call has a predetermined status such as delinquent payment. Upon receiving the query message, data base 108 interrogates its memory in a well-known manner to obtain the status of the billing number involved with the call.

Figure 6:
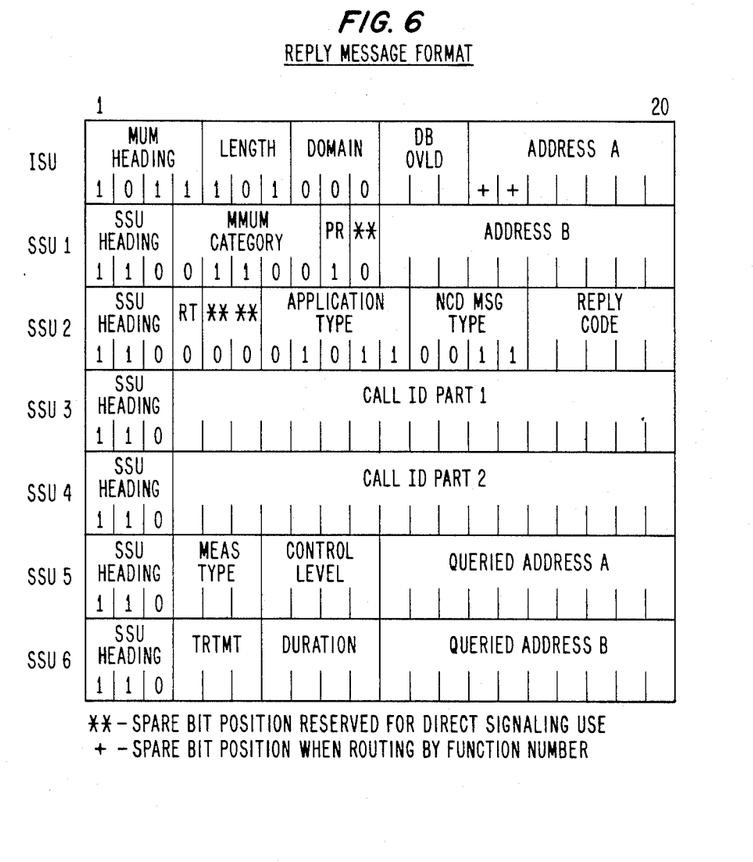
FIG. 6 depicts an illustrative reply message format.

The data base may store billing numbers in at least two different ways. First, only those billing numbers of customers having a predetermined status such as delinquent payment are stored in the data base. Thus, for example, when the billing number involved with the call is in the data base list, the data base sends to the toll office a "deny call" reply message to disallow the extension of the call through the toll network. Second, the data base may store the billing numbers of all customers served by the network in its memory. In this case, when a query message is received from a toll office, the data base interrogates its memory to obtain the status or other information stored with the billing number and sends a reply message, such as a "deny call" or "allow call" message, depending on the stored status or information. Depicted in FIG. 6 is the format of an illustrative CCIS reply message. Table III lists the field of the reply message depicted in FIG. 6.

TABLE III

Reply Message Content

A. Domain - bits 8-10/ISU

The domain field specifies how the address A and address B fields should be interpreted to route the message through the network.
    000        Function Number B. DB OVLD - bits 11-13/ISU The data base overload (DB OVLD) level is obtained in this field. The values range from 000 (normal condition) to 111 (severest overload).

C. Address A - bits 16-20/ISU

This field contains the five high-order bits of the return address.

TABLE III-continued
Reply Message Content

D. Address B - bits 11-20/1SSU

Address field B contains the remaining low-order 10-bits of the return address (function number).

E. Direct Signaling Application Type - bits 7-11/2SSU

The Direct Signaling Application Type identifies the application that uses a given message.
        01011       Network Call Denial F. NCD Message Type - bits 12-15/2SSU The NCD Message Type indicates that this is a reply message.
        0011       NCD Reply Message G. Reply Code bits 16-20/2SSU The reply code indicates the results of NCD query processing.

| | |
|---|---|
| 00000 | Unable to process - miscellaneous reasons |
| 00001 | Unable to process - overload |
| 00010 | Allow AT&T-C call |
| 00011 | Deny AT&T-C call |

H. Call Identification Part 1 - bits 4-20/3SSU

This field contains the Call Identification Part I that was received in the associated query message.

I. Call Identification Part 2 - bits 4-20/4SSU

This field contains the Call Identification Part 2 that was received in the associated query message.

J. Measurement Type - bits 4-6/5SSU

This field (MEAS. TYPE) indicates the reason why the control is being requested. The field assignments are:

| | |
|---|---|
| 000 | NCD/NCP overload |
| 001 | NOCS-initiated control (assigned for possible future use) |
| 010-111 | Unassigned |

K. Control Level - bits 7-10/5SSU

This field contains the NCP overload control level for use by switches using a call gapping control for NCP overloads.

L. Queried Address A - bits 11-20/5SSU

This field contains the data that was received in the address A field of the associated query message.

M. Treatment Type - bits 4-6/6SSU

This field (TRTMT) is reserved for future NCD use.

N. Control Duration - bits 7-10/6SSU

This field contains the NCP overload control duration level for use by switches using a call gapping control for NCP overloads.

O. Queried Address B - bits 11-20/6SSU

This field contains the data that was received in the address B field of the associated query message.

In this illustrative embodiment, only those billing numbers having a predetermined status, such as delinquent payment, are stored in the data base memory. When the billing number involved with the call is not in the data base list ("no" leg of block 206), the data base does not return a reply message, and the toll office switches and completes the extension of the call through the network (block 207).

When the billing number of the calling customer is in the data base list ("yes" leg of block 206), the data base returns a "deny call" reply message to toll office 105 (block 208). The query and reply messages also include information to identify the particular call. Upon receiving the "deny call" reply message, toll office 105 disallows the extension of the call through the network. In addition, the toll office announces the call disallowance to the calling customer (block 209). The toll office may also announce to call a telephone number for more information concerning the call disallowance. After the announcements are made, the toll office disconnects the call. The calling customer now has the option of attempting another call to the same called customer and receiving the same announcement or calling the called customer with the aid of an operator system.

As previously indicated, the calling customer may initially enlist the aid of an operator system by first dialing a digit "0" followed by the called customer number. When the calling customer enlists the aid of an operator system, as indicated by the "yes" leg of decision block 204, local office 103 forwards the call to the operator system 123 via trunk 155, which in turn sends a query message to data base 108 (block 210). This query message again includes the billing number of the calling customer, a call identifier, and a demand response indicator.

Upon receiving the query message, the data base searches its list of delinquent payment status billing numbers for the billing number involved with the call (block 211). When the billing number involved with the call is not in the list, as indicated by the "no" leg of decision block 211, the data base returns a CCIS "allow call" reply message to operator system 123 to allow the extension of the call through the toll network (block 212). The operator system forwards the call via trunk 155 to switching system 122 to switch and complete the extension of the call through the toll network (block 213).

When the billing number involved with the call is in the data base list of delinquent payment status billing numbers as depicted in the "yes" leg of decision block 211, data base 108 returns a "deny call" reply message to operator system 123 to disallow the extension of the call through the toll network (block 214). When an operator has not assisted the calling customer, such as with an operator system utilizing recorded announcements as depicted by the "no" leg of decision block 215, the operator system disallows the extension of the call through the toll network and announces the call disallowance to the calling customer as previously described (block 209).

When an operator has actually assisted the calling customer as depicted by the "yes" leg of decision block 215, the operator does not initially allow completion of the call through the toll network (block 216). However, the operator does offer the calling customer alternate billing arrangements (block 217). These alternate arrangements include billing the call to a credit or calling card number, a third party billing number, or a personal identification number that does not have a delinquent payment status. In addition, the calling customer may decide to place a "collect" call to the called customer. Upon receiving an alternate billing number from the calling customer, as depicted by the "yes" leg of decision block 218, the operator causes the operator system to send the alternate billing number in another query message to data base 108 to search its list for the alternate billing number. After the search, the data base returns either an "allow call" or "deny call" reply message depending on whether or not the alternate billing number from the calling customer is in the data base list.

When the calling customer does not provide an alternate billing number or arrangements for the call, as depicted by the "no" leg of decision block 218, the operator system disallows the extension of the call through the toll network (block 219) and terminates the call (block 220).

It is to be understood that the above-described method and apparatus for disallowing the extension of a call originated by a calling customer through a toll network is merely an illustrative embodiment of the principles of this invention and that numerous other arrangements may be devised by those skilled in the art without departing from the spirit and scope of this invention. In particular, the data base may contain the billing numbers of all customers served by the toll network. In this case, either a "deny call" or "allow call" reply message is always returned. In addition, this complete customer billing number list may be used to establish credit limits, gather billing information concerning charges for each call, or provide other billing information associated with each customer or customer line.

What is claimed is:

1. For use with a telecommunications network serving a plurality of systems serving a plurality of customer lines, a method utilized by one of said systems of disallowing an extension through said network of a call originated from a calling one of said customer lines, comprising the steps of:
   determining the status of a billing number identifying said calling customer line from a data base shared by said systems and having the status of a plurality of billing numbers in response to said call; and
   disallowing said extension of said call through said network when said billing number has a predetermined status.

2. The method of claim 1 wherein said step of determining comprises the steps of:
   sending said billing number to said data base; and
   receiving a reply message from said data base for disallowing said extension of said call through said network when said billing number has said predetermined status.

3. The method of claim 1 further comprising the step of sending a message to said calling customer line for announcing a disallowance of said call through said network when said billing number has said predetermined status.

4. The method of claim 1 further comprising the step of allowing said extension of said call through said network when said billing number has a second predetermined status.

5. The method of claim 1 further comprising the steps of determining the status of a second billing number when said extension of said call through said network has been disallowed and allowing said extension of said call through said network when said second billing number has a second predetermined status.

6. For use with a telecommunications network serving a plurality of systems serving a plurality of customer lines, a method of disallowing an extension through said network of a call originated from a calling one of said customer lines, comprising the steps of:
   searching a list of billing numbers having a delinquent payment status in a data base shared by said systems for a billing number identifying said calling customer line in response to said call; and
   disallowing said extension of said call through said network when said billing number is in said list.

7. The method of claim 6 wherein one of said systems has a plurality of terminations for receiving calls from said customer lines and wherein said method further includes the steps of determining the termination of which said call is received and allowing said extension of said call through said network, regardless of whether or not said billing number is in said list, when said call is received on certain of said terminations.

8. The method of claim 6 wherein said method further includes the steps of determining to which one of said lines said call is being directed and allowing said extension of said call through said network, regardless of whether or not said billing number is in said list, when said call is being directed to a predetermined one of said lines.

9. The method of claim 6 wherein said method further includes the step of allowing said extension of said call through said network to a called one of said customer lines when said called customer line has a predetermined identification number.

10. The method of claim 6 further comprising the step of allowing said extension of said call through said network when said billing number is not in said list.

11. The method of claim 10 wherein said method further comprises one of said systems switching said call through said network when said billing number is not in said list.

12. The method of claim 6 further comprising the step of sending a message to said calling customer line indicating said disallowance of said call through said network when said billing number is in said list.

13. The method of claim 6 further comprising the steps of:
   searching said list for a second billing number when said first-recited billing number is in said list; and
   allowing said extension of said call through said network, even though said first-recited billing number is in said list, when said second billing number is not in said list.

14. For use with a telecommunications network serving a plurality of systems serving a plurality of customer lines, a method of controlling a disallowance of an extension through said network of a call originated by a calling one of said customer lines, comprising the steps of:
   interrogating a memory having stored therein the status of a plurality of billing numbers in a data base, utilized by said systems, for the status of a billing number and identifying said calling customer line in response to said call; and
   controlling from said data base a disallowance of an extension of said call through said network when said billing number has a predetermined status.

15. The method of claim 14 wherein said step of controlling includes the step of sending a reply message from said data base to one of said systems serving said calling customer line for disallowing said extension of said call through said network when said billing number has said predetermined status.

16. The method of claim 14 further comprising the step of controlling an allowance of said extension of said call through said network when said billing number has a second predetermined status.

17. The method of claim 16 wherein said step of controlling said allowance includes the step of sending a reply message for allowing said extension of said call through said network when said billing number has said second predetermined status.

18. For use with a toll interconnect carrier network serving a plurality of systems for processing calls between local networks serving a plurality of customer lines, a method of disallowing an extension through said toll interconnect carrier network of a call originated from a calling one of said customer lines, comprising the steps of:

determining the status of a billing number identifying said calling customer line from data base means utilized by said systems and having the status of a plurality of billing numbers in response to said call; and disallowing said extension of said call through said toll interconnect carrier network when said billing number has a predetermined status.

19. The method of claim 18 further comprising the step of allowing said extension of said call through said toll interconnect carrier network when said billing number has a second predetermined status.

20. For use with a telecommunications network serving a plurality of customer lines and having a system for processing calls through said network, a method utilized by said system of disallowing an extension through said network of a call originated from a calling one of said customer lines of:

sending a billing number identifying said calling customer line to data base means having the status of a plurality of billing numbers in response to said call; and disallowing said extension of said call through said network in response to a reply message received from said data base means indicating that said billing number has a predetermined status.

21. The method of claim 20 wherein said method further comprises allowing said extension of said call through said network after the first-recited reply message has been received in response to a second reply message from said data base means indicating that said billing number has a second predetermined status.

22. An interconnect carrier network comprising:

system means for serving a plurality of switching systems processing calls for a plurality of customer lines; and data base means shared by said system means and having the status of a plurality of billing numbers and responsive to a call originated from a calling one of said customer lines for extension through said network for obtaining the status of a billing number identifying said calling customer line for selectively allowing or disallowing said extension of said call through said network when said billing number has a predetermined status.

23. A data base for serving a plurality of systems processing calls for a plurality of customer lines, comprising:

means for storing payment status of a plurality of billing numbers, means for obtaining the payment status of a billing number identifying a calling one of said customer lines from which a call originated in response to a receipt of said billing number from one of said systems, and means for effecting a disallowance of said call when said billing number has a predetermined payment status.

24. The data base of claim 23 further comprising means for effecting an allowance of said call when said billing number has a second predetermined payment status.

25. Apparatus for disallowing an extension through a telecommunications network of a call orginated from a calling customer line, comprising:

data base means for storing payment status of a billing number identifying said calling customer line, and system means in response to said call for disallowing said extension of said call through said network when said billing number identifying said calling customer line has a predetermined payment status.

26. The apparatus of claim 25 further comprising means for changing said payment status of said billing number.

27. For use with a telecommunications network serving a plurality of customer lines, a method of disallowing an extension through said network of a call originated by a calling one of said customer lines, comprising the steps of:

storing in a data base the payment status of a plurality of billing numbers, determining the payment status of a billing number identifying said calling customer line from said data base in response to said call; and disallowing said extension of said call through said network when said billing number has a predetermined payment status.

28. For use with a telecommunications network serving a plurality of customer lines, a system for disallowing an extension through said network of a call originated from a calling one of said customer lines, comprising:

means for determining payment status of a billing number identifying said calling customer line from a data base shared by a plurality of said systems and having the payment status of a plurality of billing numbers in response to said call, and means for disallowing said extension of said call through said network when said billing number has a predetermined payment status.

29. The system of claim 28 wherein said means for determining comprises means for sending a query message including said billing number to said data base for said call and means responsive to a reply message indicating said billing number has said predetermined payment status from said data base for effecting a disallowance of said extension of said call through said network.

30. The system of claim 29 further comprising means for sending a message to said calling customer line for announcing said disallowance of said extension of said call through said network when said billing number has said predetermined payment status.

31. A method of processing through a toll interconnect carrier network a call originated from a calling one of a plurality of customer lines, comprising:

storing in a memory of a data base serving a plurality of switching systems a list of billing numbers having a delinquent payment status;

in response to said call originated from said calling customer line served by a first switching system to a called one of said customer lines identified by a called number entered via said calling customer line and served by a second switching system interconnectable via said toll network with said first switching system, forwarding from said first system to a switching system serving said toll network said call including said called number and a billing number identifying said calling customer line;

allowing an extension of said call through said network without sensing said billing number identifying said calling customer line to said data base when said call is received on a predetermined termination of said switching system serving said toll network, said call is to a predetermined called number, or said billing number identifying said calling customer line is a predetermined billing number;

sending from said system serving said network said billing number identifying said calling customer line in a query message for said call to said data base in response to said call;

interrogating said memory of said data base storing said list of billing numbers for said billing number identifying said calling customer line in response to said query message;

returning a reply message for said call from said data base to said system serving said network for disallowing said extension of said call through said network when said billing number indentifying said calling customer line is in said list of billing numbers having said delinquent payment status;

sending a message from said system serving said network to said calling customer line for announcing a disallowance of said extension of said call through said network in response to said reply message;

disconnecting said call at said system serving said network after sending said message for announcing said disallowance of said extension of said call through said network; and allowing said extension of said call through said network when said reply message is not received for said call.

32. For use with a system of a plurality of systems serving a telecommunications network and a plurality of customer lines, a method of disallowing an extension through said network of a call originated from a calling one of said customer lines, comprising the steps of:

determining in response to said call the status of a number identifying said calling customer line from a data base shared by said systems and having the status of plurality of numbers each for identifying an individual one of said lines; and disallowing said extension of said call through said network when said number identifying said calling customer line has a predetermined status.

33. For use with a system of a plurality of systems serving a telecommunications network and a plurality of customer lines, a method of disallowing an extension through said network of a call originated from a calling one of said customer lines, comprising the steps of:

searching in response to said call a list of numbers, each for identifying an individual one of said lines, in a data base shared by said systems for a number identifying said calling customer line; and disallowing said extension of said call through said network when said number identifying said calling customer line is in said list of numbers.

34. The method of claim 33 wherein said method further includes disallowing said extension of said call through said network, regardless of whether or not said number identifying said calling customer line is in said list, when said call is to a predetermined one of said customer lines.

35. For use with a system of a plurality of local exchange carrier switching systems serving an interconnect carrier telecommunications network and plurality of customer lines, a method of disallowing an extension through said network of a call originated from a calling one of said customer lines, comprising the steps of:

searching in response to said call a plurality of numbers, each for identifying an individual one of said lines, in a data base shared by said systems for a number identifying said calling customer line, and disallowing said extension of said call through said network when said number identifying said calling customer line is one of said plurality of numbers in said data base.

36. A system of a plurality of local exchange carrier telecommunications systems for disallowing an extension through an interconnect carrier network of a call originated from a calling customer line of a plurality of customer lines, comprising:

means responsive to said call for sending a query including a number identifying said calling customer line to a data base shared by said systems and having a plurality of numbers each for identifying an individual one of said lines, and means for disallowing said extension of said call through said interconnect carrier network when a response to said query indicates that said number identifying said calling customer line is one of said plurality of numbers in said data base.

37. For use with a plurality of interconnect carrier networks serving a plurality of lines and each having a data base, a local exchange carrier system for disallowing an extension through a network of said interconnect carrier networks of a call originated from a calling one of said customer lines, comprising:

means, responsive to said call designating said network, for sending a number identifying said calling customer line to the data base of said designated network, having a status for a plurality of numbers each for identifying an individual one of said customer lines, and means, responsive to a message from the data base of said designated network, for disallowing said extension of said call through said designated network when the status of said number identifying said calling customer line in the data base of said designated network is a predetermined status.

38. For use with a plurality of interconnect carrier networks serving a plurality of customer lines and each having a data base, a local exchange carrier system for disallowing an extension through a predetermined network of said interconnect carrier networks of a call originated from a calling one of said customer lines, comprising:

means, responsive to said calling designating said network, for sending a number identifying said calling customer line to the data base of said predetermined network, having a plurality of numbers each for identifying an individual one of said customer lines, and means responsive to a message from the data base of said predetermined network for disallowing said extension of said call through said predetermined network when said number identifying said calling customer line is one of said numbers in the data base of said predetermined network.

39. For use with a data base utilized by a plurality of systems serving a telecommunications network and a plurality of customer lines, a method of controlling a disallowance of an extension through said network of a call originated by a calling one of said customer lines, comprising the steps of:

interrogating a memory having a plurality of numbers, each for identifying an individual one of said lines, for a number identifying said calling customer line in response to said call; and controlling a disallowance of an extension of said call through said network when said number identifying said calling customer line is one of said plurality of numbers.

40. For use with a system of a plurality of systems serving a toll interconnect carrier network for processing calls between local networks serving a plurality of customer lines, a method of disallowing an extension through said toll interconnect carrier network of a call originated from a calling one of said customer lines comprising the steps of:

determining in response to said call the status of a number identifying said calling customer line from data base means utilized by said systems and having the status of a plurality of numbers each for identifying an individual one of said lines; and disallowing said extension of said call through said toll interconnect carrier network when said number identifying said calling customer line has a predetermined status.

41. For use with a system of a plurality of systems serving a telecommunications network and a plurality of customer lines, a method of disallowing an extension through said network of a call originated from a calling one of said customer lines, comprising the steps of:

sending a number identifying said calling customer line of data base means serving said systems and having a plurality of numbers each for identifying an individual one of said lines in response to said call; and disallowing said extension of said call through said network in response to a reply message received from said data base means indicating that said number identifying said calling customer line is one of said plurality of numbers.

42. An interconnect carrier network comprising:

system means for serving a plurality of switching systems processing calls for a plurality of customer lines; and data base means shared by said system means, having a plurality of numbers each for identifying an individual one of said lines, and responsive to a call originated from a calling one of said customer lines for extension through said network for searching said numbers for said number identifying said calling customer line, for selectively allowing or disallowing said extension of said call through said network when said number identifying said calling customer line is one of said numbers.

43. A data base for serving a plurality of systems processing calls for a plurality of customer lines, comprising:

means for storing a plurality of numbers, each for identifying an individual one of said lines, means for searching said numbers for a number identifying a calling one of said customer lines from which a call originated in response to a receipt of said number identifying said calling customer line from one of said systems, and means for effecting a disallowance of said call when said number is one of said plurality of numbers.

44. For use with a telecommunications network serving a plurality of customer lines, a system for disallowing an extension through said network of a call originated from a calling one of said customer lines, comprising;

means for determining whether or not a number identifying said calling customer line is one of a plurality of numbers, each of identifying an individual one of said lines in a data base shared by a plurality of said systems in response to said call, and means for disallowing said extension of said call through said network when said number identifying said calling customer line is one of said numbers in said data base.

* * * * *

UNITED STATES PATENT AND TRADEMARK OFFICE
CERTIFICATE OF CORRECTION

PATENT NO. : 4,756,020

DATED : July 5, 1988

INVENTOR(S) : Joseph V. Fodale

It is certified that error appears in the above-identified patent and that said Letters Patent is hereby corrected as shown below:

IN THE SPECIFICATION

Column 3, line 55, "cell" should be "call".

IN THE CLAIMS

Column 14, line 11, after "lines" insert --, regardless of whether or not said billing number is in said list,--
Column 14, line 42, delete "and"
Column 15, line 18, after "lines" insert --, comprising the steps--
Column 16, line 64, "sensing" should be "sending"
Column 17, line 61, after "and" insert --a--
Column 18, line 45, "calling" should be "call"
Column 19, line 25, "of" should be "to"
Column 20, line 30, "of", second occurrence, should be "for".

Signed and Sealed this

Twenty-sixth Day of February, 1991

Attest:

HARRY F. MANBECK, JR.

*Attesting Officer*  *Commissioner of Patents and Trademarks*